(12) United States Patent
Lindoff et al.

(10) Patent No.: US 9,300,373 B2
(45) Date of Patent: Mar. 29, 2016

(54) SELECTION OF PRECODING VECTORS IN LEAN-CARRIER SYSTEMS

(75) Inventors: Bengt Lindoff, Bjärred (SE); Fredrik Nordström, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 368 days.

(21) Appl. No.: 13/527,197

(22) Filed: Jun. 19, 2012

(65) Prior Publication Data
US 2013/0336135 A1    Dec. 19, 2013

(51) Int. Cl.
| | |
|---|---|
| *G01R 31/08* | (2006.01) |
| *H04B 7/04* | (2006.01) |
| *H04B 7/06* | (2006.01) |
| *H04L 5/00* | (2006.01) |
| *H04L 25/03* | (2006.01) |
| *H04L 25/02* | (2006.01) |

(52) U.S. Cl.
CPC ............ *H04B 7/0417* (2013.01); *H04B 7/0656* (2013.01); *H04L 5/0023* (2013.01); *H04L 5/0051* (2013.01); *H04L 25/0222* (2013.01); *H04L 25/03343* (2013.01); *H04L 25/03949* (2013.01)

(58) Field of Classification Search
None
See application file for complete search history.

(56) References Cited

U.S. PATENT DOCUMENTS

| | | | | |
|---|---|---|---|---|
| 2005/0249159 | A1* | 11/2005 | Abraham et al. ............. | 370/329 |
| 2007/0242770 | A1* | 10/2007 | Kim et al. ..................... | 375/267 |
| 2007/0254607 | A1* | 11/2007 | Bandemer et al. ........... | 455/101 |
| 2008/0043677 | A1* | 2/2008 | Kim et al. ..................... | 370/332 |
| 2008/0219370 | A1* | 9/2008 | Onggosanusi et al. ....... | 375/260 |
| 2009/0290655 | A1* | 11/2009 | Abraham et al. ............. | 375/267 |
| 2010/0238824 | A1* | 9/2010 | Farajidana et al. ........... | 370/252 |
| 2011/0149765 | A1* | 6/2011 | Gorokhov et al. ............ | 370/252 |
| 2011/0177788 | A1 | 7/2011 | Nakayama | |
| 2011/0274099 | A1* | 11/2011 | Kwon et al. .................. | 370/338 |
| 2011/0299626 | A1* | 12/2011 | Kim et al. ..................... | 375/295 |
| 2012/0057645 | A1* | 3/2012 | Tesanovic et al. ............ | 375/267 |

(Continued)

FOREIGN PATENT DOCUMENTS

CN          102833192 A       12/2012

OTHER PUBLICATIONS

Unknown, Author. "Distributed Transmission for ePDCCH." Huawei, HiSilicon. R1-120046. 3GPP TSG RAN WG1 Meeting #68. Feb. 6-10, 2012. Dresden, Germany.

(Continued)

*Primary Examiner* — Bob Phunkulh
(74) *Attorney, Agent, or Firm* — Murphy, Bilak & Homiller, PLLC (57) ABSTRACT

In a system using spatial precoding, in the event that reliable channel state information is unavailable, a transmitting node artificially creates a randomization of the precoders applied to the transmitted signal. Different precoding vectors are applied to both transmitted data and demodulation reference signals for each of several groups of time-frequency resources, where the precoding vectors vary randomly or pseudo-randomly from each group of time-frequency resources to the next frequency-adjacent group or groups, or to the next time-adjacent group or groups, or both. In an LTE system in particular, this randomization of precoders can be applied at the resource-block level or, at the level of the Precoding Resource block Group (PRG), for example. Thus, the precoders applied to the transmitted signal vary from one PRG to the next, in a random or pseudo-random fashion.

24 Claims, 4 Drawing Sheets

(56) References Cited

U.S. PATENT DOCUMENTS

| | | | |
|---|---|---|---|
| 2012/0082190 A1* | 4/2012 | Zhu et al. | 375/219 |
| 2012/0082248 A1* | 4/2012 | Han et al. | 375/259 |
| 2012/0163208 A1* | 6/2012 | Kamble et al. | 370/252 |
| 2012/0176939 A1* | 7/2012 | Qu et al. | 370/255 |
| 2013/0044610 A1 | 2/2013 | Zhao et al. | |
| 2013/0301751 A1* | 11/2013 | Badic et al. | 375/295 |

OTHER PUBLICATIONS

Unknown, Author. "Evaluation of DMRS Based Distributed Transmission for E-PDCCH." CATT. R1-122049. 3GPP TSG RAN WG1 Meeting #69. May 21-25, 2012. Prague, Czech Republic.

3rd Generation Partnership Project. 3GPP TS 36.211 V10.4.0 (Dec. 2011) Technical Specification Group Radio Access Network; Evolved Universal Terrestrial Radio Access (E-UTRA); Physical Channels and Modulation (Release 10). Dec. 2011.

3rd Generation Partnership Project. 3GPP TS 36.213 V10.5.0 (Mar. 2012) Technical Specification Group Radio Access Network; Evolved Universal Terrestrial Radio Access (E-UTRA); Physical layer procedures (Release 10). Mar. 2012.

3rd Generation Partnership Project. 3GPP TS 36.331 V10.5.0 (Mar. 2012) Technical Specification Group Radio Access Network; Evolved Universal Terrestrial Radio Access (E-UTRA); Radio Resource Control (RRC); Protocol specification (Release 10). Mar. 2012.

* cited by examiner

SELECTION OF PRECODING VECTORS IN LEAN-CARRIER SYSTEMS

BACKGROUND

The present invention generally relates to wireless communications systems, and more particularly relates to techniques for spatial precoding of signals transmitted from multiple antennas.

In several wireless communication systems, wireless receivers use one or more of several types of pilot signals to aid in demodulating the received signals. These pilot signals are commonly referred to as reference signals and/or reference symbols. In the $3^{rd}$-Generation Partnership Project (3GPP) specifications for the Long-Term Evolution (LTE) wireless system (also commonly referred to as the evolved UMTS Terrestrial Radio Access Network, or E-UTRAN), a receiving wireless device has two different pilot signal types to use for the data demodulation, common reference signals (CRS) and demodulation reference signals (DMRS). Details of these signals can be found in the 3GPP specifications, e.g., in "Evolved Universal Terrestrial Radio Access (E-UTRA); Physical channels and modulation," 3GPP TS 36.211, v. 10.4.0, December 2011 (available at www.3gpp.org).

CRS are pilots shared by all users, and are used for control channel (PDCCH) and data channel (PDSCH) demodulation as well as for signal measurements made for mobility decisions. DMRS, however, are intended for use by a single user, and thus directly correspond to data targeted to that particular user. DMRS was introduced in Release 9 of the LTE specifications; details can be found, e.g., in 3GPP TS 36.211 and 3GPP TS 36.213, which are available at www.3gpp.org.

The use of DMRS and multi-antenna transmission schemes make it possible for a sending network node to beam-form (pre-code) the transmitted pilot signals as well as the corresponding data signals, based on radio channel characteristics for the link between the transmitting node antennas and the receiver, so that optimized performance is achieved for that particular user. Precoding on the transmitter side is used to support spatial multiplexing and allows multiple signal streams to be transmitted simultaneously. This is achieved by applying a precoding matrix from a set of defined complex weighting matrices to the signal for combining data streams and mapping the combined data streams to multiple antennas for transmission.

The LTE standards continue to develop and are evolving more and more to the use of DMRS instead of CRS for estimating channel characteristics for demodulation purposes. Two main reasons for favoring DMRS over CRS are system performance improvements and coverage gains, which arise due to the possibility to dynamically optimize per-terminal performance based on the current radio channel characteristics.

Another reason for relying on demodulation pilots alone is that this approach raises the possibility that CRS can be removed completely from transmitted signals in a future release of the specifications. In systems operating according to Release 8 of the LTE specifications, CRS must be transmitted in every downlink subframe (see 3GPP TS36.211), regardless of whether or not there is any downlink data transmission in the subframe. One of the reasons for this "always-on" approach to CRS transmission is the need for idle mode terminals to be able to measure signal strength for cell selection. In releases up to at least Release 10 of the 3GPP standards, the wireless device or mobile terminal (user equipment, or UE, in 3GPP terminology) is able to choose which particular CRS to use for this purpose. As a result, the transmitting node (e.g., an evolved Node B, or eNB, in 3GPP terminology) does not know when mobile terminals are making mobility measurements, particularly if those mobile terminals are idle, and therefore cannot turn off CRS even if no actual downlink data transmission is ongoing.

Figure 1:
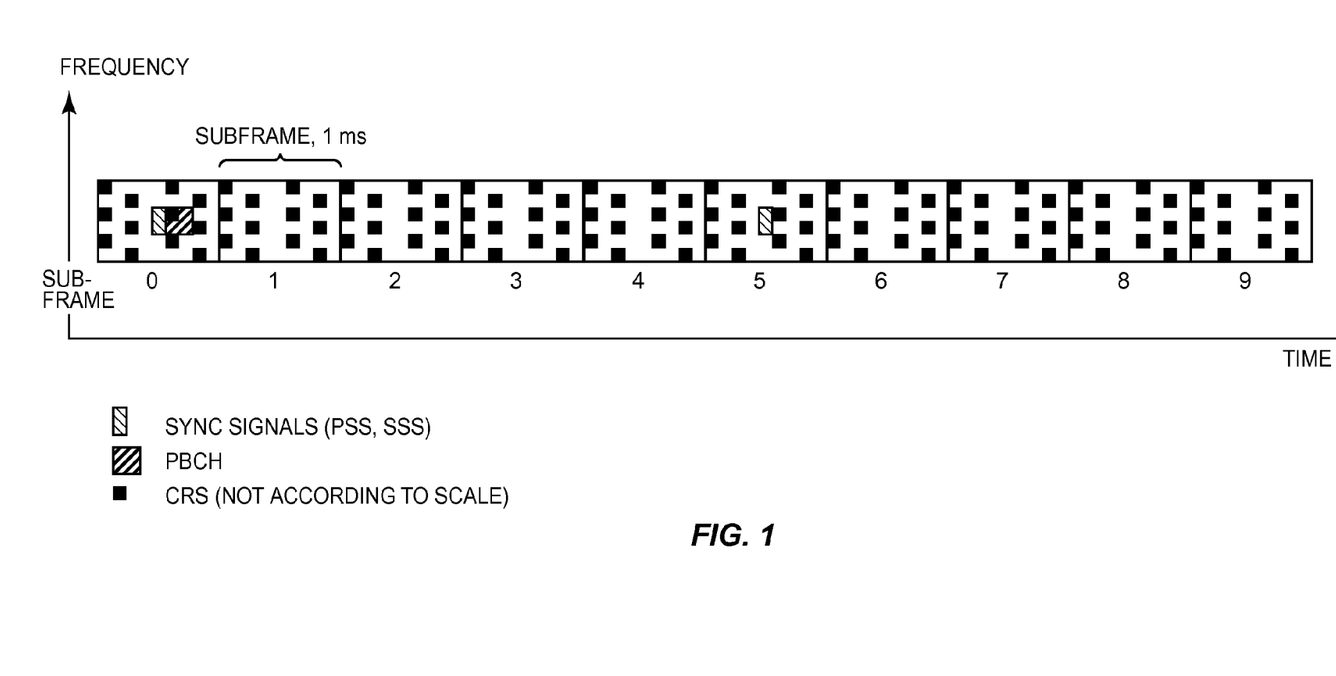
FIG. 1 illustrates the structure of a downlink frame in LTE, including the placement of synchronization signals and common reference signals.

FIG. 1 illustrates an LTE frame, including all of the signals that need to be transmitted from the network node regardless of load in the system, assuming LTE 3GPP Release 8. These signals include the Primary Sync Signal (PSS) and Secondary Sync Signal (SSS), which are found in subframes 0 and 5 of each LTE subframe, the Primary Broadcast Channel (PBCH), in subframe 0, and CRS, which are found at defined resource elements in all subframes.

As seen in the figure, the LTE frame includes 10 subframes. Each subframe consists of 14 Orthogonal Frequency Division Multiplexing (OFDM) symbols (12 when the long cyclic prefix is used), where the symbols are numbered from 0 to 13 (0 to 11 when a long cyclic prefix is used). CRS symbols, which are shown in the figure as solid black rectangles, are transmitted in OFDM symbols 0, 4, 7 and 11, on every sixth subcarrier. The SSS and PSS is transmitted in OFDM symbols 6 and 7, respectively, of subframes 0 and 5 of each LTE frame, in the central six resource blocks with respect to the system's frequency usage. The PBCH is also transmitted in several OFDM symbols in sub frame 0, again in the six central RBs.

One motivation for removing the requirement for "always-on" CRS transmission is that the base station/network node transmitter can be put into sleep mode in several, or even a majority, of the sub frames. This would allow the system to conserve energy in low-load scenarios. However, idle mode terminals need some known sync signals and CRS to rely on for synchronization to the network. This synchronization is needed for the mobile terminals to detect paging, and is also necessary for the mobile terminals to determine the proper timing for a random access transmission to a base station. However, the transmission of signals for these purposes could be done less frequently, in certain well-defined time/frequency positions that could be configured by the network node once a wireless device or mobile terminal registers with the network. Accordingly, in the discussions for the Release 11 (and onwards) for LTE, it has been proposed to only require transmitting network nodes to transmit CRS and other known data (sync symbols and broadcast messages) in a subset of the sub frames. Of course, the Primary Sync Signal and Secondary Sync Signal still need to be transmitted, for the wireless terminal to be able to do cell search and detect the cell. Since broadcast messages as well as paging signals are transmitted in sub frame 0 and 5, and since these data channels need some kind of reference signal for demodulation, there is a need to transmit sync signals and possible CRS at least in these sub frames. At a minimum, then, symbols that must be transmitted from a network node (assuming no load) are the synchronization signals and broadcast information, and possibly also some CRS in sub frames 0 and 5 for demodulation of broadcast and paging messages.

Figure 2:
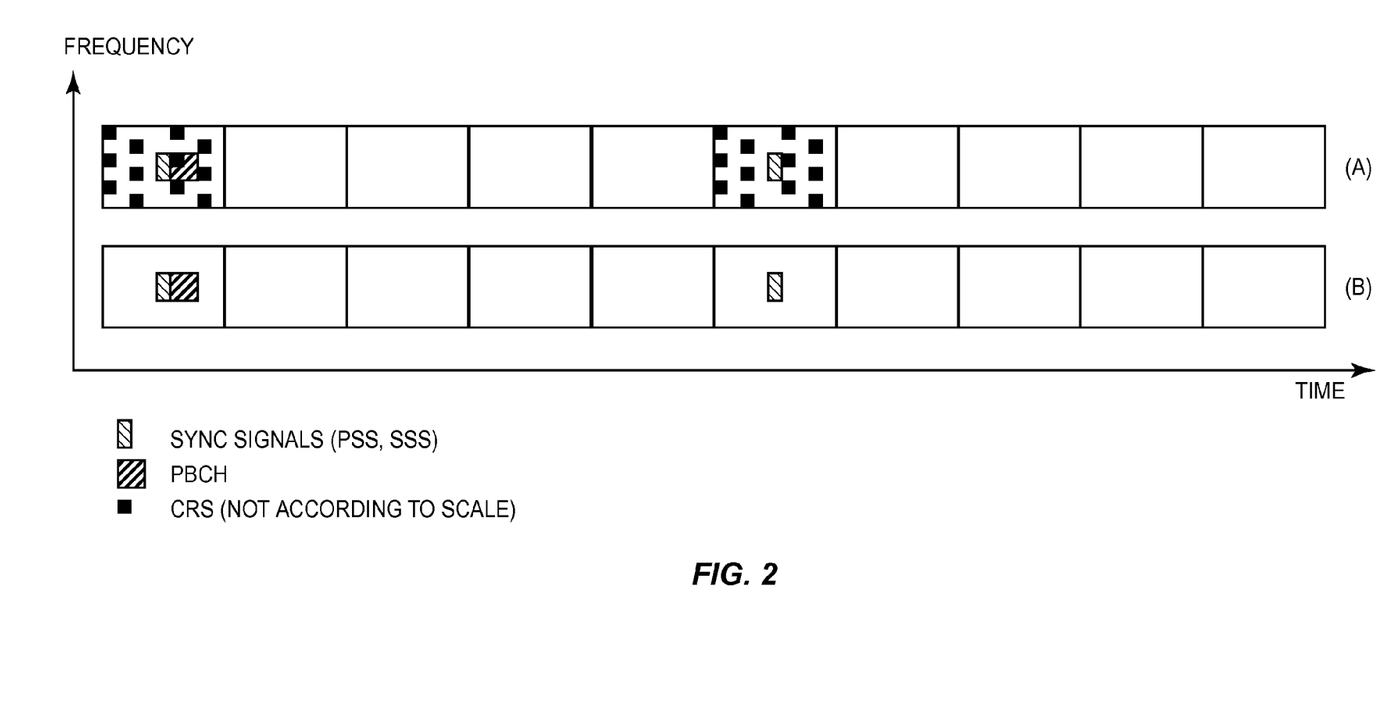
FIG. 2 illustrates two possible structures for a "lean carrier" downlink frame in LTE.

Hence, the removal of CRS gives the network (NW) node the ability to go into sleep mode in some or even a majority of the sub frames, in the event of no load or very low load. The resulting signal after this removal of CRS is called a "lean carrier" in the 3GPP standardization efforts. FIG. 2 illustrates two proposals for such lean-carrier solutions. The top of the figure, labeled "A," represents a first proposed lean carrier structure. With this proposal, CRS are transmitted only in subframes 0 and 5, along with PBCH (subframe 0) and the sync signals PSS and SSS. The lower portion of the figure illustrates a second proposal for the lean carrier's structure, labeled "B," in which no CRS at all are transmitted. In the latter case, PBCH detection at the terminal might rely on the PSS and SSS symbols. It will be appreciated that FIG. 2 illustrates two of the most extreme possibilities for a lean carrier. Lean carriers with CRS in one or more additional subframes are also possible, as are lean carrier structures in which CRS appear in only a subset of resource blocks in one or more subframes of each frame, or lean carrier structures in which CRS appear in a subset of subframes in a subset of frames. Lean carrier structures based on a combination of these features are also possible.

When a lean carrier is used, the transmitting network node need not transmit anything at all in some subframes (e.g., subframes other than 0 and 5), except when there is data to transmit. As discussed above, DMRS are preferably used when transmitting data, to optimize performance. However, in order to determine optimal pre-coding vectors (i.e., antenna-mapping weights used to apply phase and amplitude corrections to data and pilots at each of two or more antennas in a multi-antenna transmission mode) for optimized beamforming, the transmitting node needs to have knowledge of the propagation channel between the transmitting node antennas and the targeted mobile terminal. This is generally solved by letting the mobile terminal report channel state information (CSI), although other techniques for the network to learn the characteristics of the downlink channel are possible. In LTE, CSI is reported by the mobile terminal in the form of a precoder recommendation, which is based on channel measurements made by the wireless device or mobile terminal. This precoder recommendation, which includes a Precoder Matrix Indicator (PMI), is based on channel measurements made by the mobile terminal and is used by the transmitting network node to determine the best pre-coding vector for transmitting data to the mobile terminal. CSI reporting might also be based on other formats, such as signaling that indicates a measured signal-to-noise ratio (SNR) or signal-to-noise-plus-interference ratio (SINR), channel rank information, etc. Thus, while the term CSI may sometimes be used herein to refer to LTE-specific reporting of channel state information, it should be understood more generally to refer to any data that characterizes, directly or indirectly, the propagation channel from the network node's transmitting antennas to a mobile terminal.

The effective use of beam-forming relies on good knowledge of the channel characteristics to select the optimal precoder for the downlink transmissions to the mobile terminal. However, good knowledge of the propagation channel can be difficult to obtain in high speed scenarios, due to rapid changes in the channel's characteristics. There is always a delay inherent in the CSI reporting to the network node (e.g., 3-10 milliseconds), and in the event of rapid channel changes, such as might occur when the mobile terminal is moving rapidly, the CSI information might be outdated by the time it is applied to the data. Accurate knowledge of the propagation channel may be unavailable in other circumstances as well, such as when a mobile terminal first goes into active mode and does not have accurate channel estimates, or when the SNR at the mobile terminal is very low, or when the mobile terminal is not configured to send precoding information to the base station. The wrong pre-coder can thus be applied in any of these circumstances, e.g., a precoder optimized not to the present radio channel, but the radio channel as it was several milliseconds earlier. Applying a precoder based on outdated CSI might actually make the receiving conditions worse, such that there is destructive interference between the radio signals from the multiple antennas as opposed to the constructive combining that is desired.

Under Release 10 of the LTE specifications, this problem can be solved by switching from a DMRS-based transmission method to CRS-based beam forming methods. This switching is accomplished through the use of Radio Resource Control (RRC) signaling sent to the mobile terminal to indicate which transmission mode to use, CRS-based or DMRS based. Details may be found in 3GPP TS 36.331, available at www.3gpp.org. Alternatively, the system may automatically fall back to a transmit diversity (TxDiv) scheme if the terminal is configured with no precoder feedback. CRS-based channel estimation is then used by the mobile terminal for demodulating data, which is transmitted to the mobile terminal using the TxDiv or large Cyclic Delay Diversity (CDD) approaches, which are both well-known in the art and described in 3GPP TS 36.211 and 3GPP TS 36.213.

However, these approaches to handling unreliable channel state information cannot be used effectively with a lean carrier, since no CRS is present in a majority of the downlink subframes. One possible solution to this problem is to simply turn on all CRS in a cell if it becomes known that the channel state information for a single mobile terminal is unreliable or unavailable. Clearly it will not be energy efficient to turn on the CRS to solve occasional problems with unreliable or non-existent precoder information for a single mobile terminal. Further, a solution based on turning on and off the CRS would require signaling to all UEs in the cell, to notify them of this CRS reconfiguration.

Hence, there is a need for improved techniques for managing DMRS-based and CRS-based transmissions in the event that reliable precoder information is unavailable, especially when techniques like lean carrier are used.

SUMMARY

In a system using spatial precoding, in the event that reliable channel state information is not available, a transmitting node according to some embodiments of the invention artificially creates a randomization of the precoders when using DMRS-based transmission. More particularly, different precoding vectors are applied to both transmitted data and the DMRS for each of several groups of time-frequency resources, where the precoding vectors vary randomly or pseudo-randomly from each group of time-frequency resources to the next frequency-adjacent group or groups, or to the next time-adjacent group or groups, or both.

In an LTE system in particular, this randomization of precoders can be applied at the resource-block level or, more preferably, at the level of the Precoding Resource block Group (PRG). Thus, the precoders applied to the transmitted signal vary from one PRG to the next, in a random or pseudo-random fashion.

An example method according to some embodiments of the invention is implemented in a first node of a wireless communication system, such as an LTE eNodeB, where the first node is configured to transmit data to a second node, such as a wireless terminal or user equipment. This example method begins with an evaluation of channel state information (CSI) corresponding to the second node, to determine whether the CSI is likely to be unreliable for a given transmission time interval. Upon a determination that reliable CSI is unavailable, the method continues with a transmission of data and demodulation reference symbols to the second node over multiple transmit antennas in each of a plurality of groups of time-frequency resources during the transmission time interval, using a precoding vector applied to the data and the demodulation reference symbols for each group of time-frequency resources. The precoding vectors vary randomly or pseudo-randomly from each group of time-frequency resources to the next frequency-adjacent group or groups, or from each group of time-frequency resources to the next time-adjacent group or groups, or both.

In some of these embodiments, the CSI is first received from the second node, e.g., as a Channel Quality Indicator (CQI) report. In other embodiments or in other instances, the CSI is estimated, based on uplink transmissions from the second node.

In some embodiments, the evaluation of the CSI to determine whether it is likely to be unreliable includes evaluating the CSI to determine whether a variability in channel conditions over time exceeds a threshold. In some of these embodiments, the CSI comprises a recommended precoder, and determining that a variability in channel conditions over time exceeds a threshold comprises counting a number of changes in recommended precoder over a time interval and comparing the number of changes to the threshold. In some embodiments, the evaluation of the CSI to determine whether it is likely to be unreliable includes evaluating an age of the received first channel station information relative to the first transmission time interval and determining whether the age exceeds a threshold.

In some embodiments, such as some of those implemented in an LTE system, each group of time-frequency resources comprises one or more time-frequency resource blocks, each corresponding to a plurality of sub-carrier frequencies, and the precoding vectors are applied in such a manner that the precoding vector for each group of time-frequency resources is constant for all sub-carrier frequencies within a group. In some embodiments, each group is a Resource Block Group, as defined by 3GPP specifications.

Because the precoders are randomly or pseudo-randomly applied, data carried by some of the groups of time-frequency resources will receive a favorable precoding, as perceived by the receiving node, while other groups will receive less favorable precoding. As a result, "good" and "bad" data bits will be spread across the time-frequency resources. In some embodiments, a transmitted data block is first encoded, using a turbo code, and the resulting encoding bits are then interleaved across the groups of time-frequency resources. With this approach, the originally transmitted data block can be successfully recovered, in many circumstances. In several embodiments of the present invention, the variation of the precoders advantageously creates robustness against outdated or incorrect precoder information.

When CSI for the remote node is determined to be reliable, conventional transmission schemes can be used, including, for example, the multi-antenna transmission schemes specified in the LTE specifications. With these conventional transmission schemes, the precoding vectors applied to data and demodulation reference symbols are derived from the CSI.

Further details of the above-summarized methods are provided in the following detailed description. In addition, apparatus configured to carry out one or more of these methods are described. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

The invention is described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Thus, components or features from one embodiment may be assumed to be present or used in another embodiment, where such inclusion is suitable.

For purposes of illustration and explanation only, these and other embodiments of the present invention are described herein in the context of operating in a radio access network (RAN) that communicates over radio communication channels with wireless terminals (also referred to as user equipment, or "UEs"). More particularly, specific embodiments are described in the context of systems using Long-Term Evolution (LTE) technology, also known as evolved UMTS Terrestrial Radio Access Network (E-UTRAN), as standardized by the membership of the $3^{rd}$ Generation Partnership Project (3GPP). It will be understood, however, that the present invention is not limited to such embodiments and may be embodied generally in various types of communication networks. As used herein, the terms mobile terminal, wireless terminal, wireless device or UE can refer to any device that receives data from a communication network, and may include, but are not limited to, a mobile telephone ("cellular" telephone), laptop/portable computer, pocket computer, hand-held computer, modem and/or desktop computer. It could also include machine-to-machine type communication devices, used without direct human interaction. One example of such device would be a sensor.

Also note that the use of terminology such as "base station" (which may be referred to in various contexts as NodeB, for example) and "wireless terminal," "mobile terminal," or "wireless device" (often referred to as "UE" or "User Equipment") should be considering non-limiting and does not necessarily imply a certain hierarchical relation between two particular nodes of a communication link. In general, a base station (e.g., a "NodeB") and a wireless terminal (e.g., a "UE") may be considered as examples of respective different communications devices that communicate with each other over a wireless radio channel.

Likewise, the terms "transmitting node" and "receiving node" may be used herein to distinguish one device from another, with the "transmitting" and "receiving" designations used only to indicate which device is at which end of a particular transmission or transmissions of interest. Again, the use of these terms does not necessarily imply a certain hierarchical relation between two particular nodes of a communication link. It should be appreciated, of course, that a "transmitting node" may often (and may generally) include receiving hardware, just as a "receiving node" may be adapted to transmit signals as well. While embodiments discussed herein may focus on wireless transmissions in a downlink from a base station (an eNodeB, in LTE specifications) to a UE, the inventive techniques may also be applied, for example, to uplink transmissions in some contexts. As a result, several embodiments of the invention described in detail below may be suitable for use in various wireless terminals, base stations, or both. It will be appreciated, of course, that the details of accompanying circuitry, including antennas, antenna interface circuits, radio-frequency circuits, and other control and base band circuits, will vary, depending on the specific application of the inventive techniques disclosed herein. Because these details are not necessary to a complete understanding of the present invention, those details are generally omitted in the following discussion and in the accompanying figures.

As of Release 10 of the LTE specifications, there are nine transmission modes (TRM) defined for downlink transmissions. The device is informed by the network, via Radio Resource Control (RRC) signaling, of which transmission mode to use.

TRM 1 and TRM 2 correspond to transmissions using one and two transmitting node antennas, respectively, with CRS used by the receiving node for demodulation. TRM 3 is an open-loop spatial multiplexing mode that operates the same as TRM 2 if the rank of the channel is one but that uses a large-delay Cyclic-Delay Diversity (CDD) transmission mode otherwise. TRMs 4 and 6 correspond to closed-loop spatial multiplexing—multiple information streams are transmitted in TRM 4, while TRM 6 sends only a single code word, using a beam-forming pre-coder. TRM 5 is related to multi user-MIMO schemes, where spatially multiplexed information streams are targeted to different users.

TRMs 1-6 are all CRS-based methods, in that the UE receiver uses CRS to measure the propagation channel for demodulation purposes. TRMs 7, 8, and 9, on the other hand, are different versions of DMRS-based transmission schemes. TRM 7 is used for UE-specific beam-forming, but without closed-loop pre-coding feedback from the UE. TRM 8 is a dual-layer transmission mode that may use closed-loop pre-coding feedback. TRM 9 supports both single-user and multi-user MIMO transmission, without the need for the UEs to be reconfigured by higher-layer signaling when switching between single-user and multi-user transmission. Of these DMRS-based modes, TRM 9 is expected to be the most commonly used.

As discussed above, the effective use of multi-antenna transmission schemes depends on the availability of accurate information about the propagation channel between the transmitting node and the targeted receiver, so that the transmitting node can select the optimal precoder for the transmissions. However, accurate information for the propagation channel can be difficult to obtain in several scenarios, including scenarios in which the receiver is moving rapidly.

Under Release 10 of the LTE specifications, this problem can be addressed, at least in part, by switching from a DMRS-based transmission method to CRS-based beam forming methods, i.e., from any one of TRMs 7-9 to one of TRMs 1-6. However, these approaches to handling unreliable channel state information cannot be used effectively with a lean carrier, since no CRS is present in a majority of the downlink subframes. As noted above, turning on CRS transmission in all subframes to accommodate one or a few mobile terminals in a cell is an unattractive solution. As of Release 10 of the LTE specifications, TRM 9 supports a fallback mode to a transmit diversity (TxDiv), when there is precoding information sent in the uplink. This TxDiv transmission is only rank 1 transmission, however.

Instead, with the techniques disclosed below, higher rank transmission may be used even when the channel state feedback from the UE is unreliable, e.g., because the UE is moving so quickly that the feedback is out of date before it can be put to use. These techniques may also be used when lean carriers are in use.

These techniques involve an artificially induced randomization of the applied precoders when using DMRS-based transmission. More particularly, different precoding vectors are applied to both transmitted data and the DMRS for each of several groups of time-frequency resources, where the precoding vectors vary randomly or pseudo-randomly from each group of time-frequency resources to the next frequency-adjacent group or groups, or to the next time-adjacent group or groups, or both.

In an LTE system in particular, this randomization of precoders can be applied at the resource-block level or, more preferably, at the level of the Precoding Resource block Group (PRG). Thus, the precoders applied to the transmitted signal vary from one PRG to the next, in a random or pseudo-random fashion.

The receiving device uses the DMRS within a group of time-frequency resources, e.g., within an PRG, to demodulate the data carried by those time-frequency resources. Because the precoding is selected randomly, the precoding will be effective (i.e., a good match to the actual channel conditions) for some groups of time-frequency resources, and less effective for others. However, because the turbo-encoded data bits are interleaved among all of the time-frequency resources allocated to the receiver, "good" bits and "bad" bits are spread randomly throughout the turbo-encoded data, allowing the original data to be successfully recovered in many circumstances. According to the embodiments the randomization of the precoders thus advantageously creates robustness against outdated or incorrect precoder information.

Because the receiving device uses the DMRS within a given group of time-frequency resources to demodulate the data carried by those resources, there is no need for signaling which precoders are used. Accordingly, the details of the randomization need not be standardized.

Figure 3:
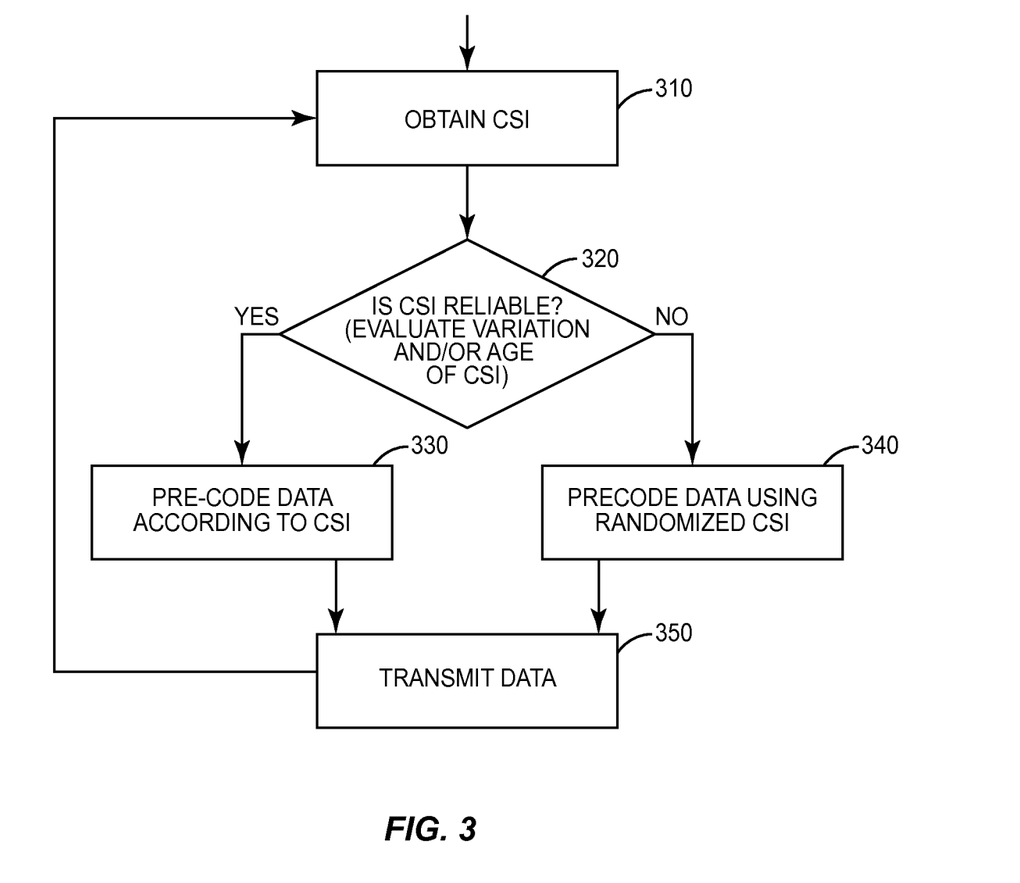
FIG. 3 is a process flow diagram illustrating an example method according to some embodiments of the present invention.

FIG. 3 is a process flow diagram illustrating these techniques according to several embodiments of the present invention. The illustrated process might be applicable, for example, when a UE is in active mode and served by a network node/eNodeB/base station in a wireless network. Although the illustrated technique is more generally applicable, the downlink transmission in this example scenario is based on user-specific reference signals, e.g., DMRS, such as TRM 9 in LTE, and there is no support for common reference signals in downlink. This might be the case, for example, when an LTE lean carrier is in use.

The illustrated process begins, as shown at block 310, with the obtaining of Channel State Information (CSI) from a wireless device, i.e., a remote node to be targeted by a pre-coded transmission of data. This CSI may comprise a Channel Quality Indicator (CQI) report received from a UE, for example, including a Precoding Matrix Indicator and/or a Rank Indicator (RI). CSI obtained from the remote node may take other forms, however. Further, the CSI obtained from the wireless device may not be an explicit CSI report. In some cases the CSI may be obtained by receiving the CSI from the wireless device/terminal and in other cases by evaluating transmissions from the wireless device and estimating the channel conditions to the wireless device from those transmissions.

In many cases, however, CSI consists of suggested pre-coding vectors/matrices sent by the targeted wireless device/terminal. Under normal circumstances, the base station can obtain or compute precoders from the CSI, often by simply applying the suggested pre-coding vectors to the transmitted data symbols and/or DMRS. Techniques for evaluating the channel conditions and selecting a best precoding vector, e.g., from a codebook of precoders, are well known in the art and are thus are not detailed herein.

Referring again to FIG. 3, the present technique continues, as shown at block 320, with an evaluation of whether the channel state information (CSI) for the remote node is likely to be reliable or unreliable for a given transmission time interval. One way to assess the reliability of the CSI is based on the variation of the received CSI over time. In the case of a slowly varying channel (e.g., corresponding to UE speeds of under 30 km/h) the CSI reported in adjacent subframes are substantially the same or varying very slowly and are thus likely to be reliable. However, in the case of high velocity, the pre-coding vectors will change significantly between adjacent subframes. This implies that they will be outdated once the transmitting node applies the pre-coding vectors to the DMRS and data symbols. They are thus likely to be unreliable. Other examples of when CSI (e.g., precoder recommendations) provided from the remote device are unreliable include: in the case of low signal-to-noise ratio (SNR) at the remote device; at the start-up of a connection or upon the initialization of some transmission modes, such as LTE TRM 9; and when the terminal is configured to not feedback any precoder information (e.g., to limit uplink control signaling).

Based on an evaluation of any or several of the above conditions, the base station (or other transmitting node) thus determines whether the precoders are unreliable. This can be determined from fast changes of the suggested precoder or other CSI received from the remote node, e.g., by evaluating the first channel state information and determining that a variability in channel conditions from one time interval to another (e.g., from one CSI reporting time to another) exceeds a threshold. Similarly, the number of significant precoder changes over a particular amount of time (e.g., 10 milliseconds) may be evaluated, and compared to a threshold. If, for example, more than three large changes have occurred in a 10-millisecond time frame, then the CSI for the present transmission time interval is defined to be unreliable. Of course, other thresholds may be used. Still another approach is to evaluate an age of the channel station information, relative to the transmission time interval of interest, and determining whether the age exceeds a threshold and then the CSI are defined to be unreliable, otherwise they are found to be reliable. Any of these approaches can be combined, in various embodiments of the invention.

If it determines that the CSI for the remote node is reliable, the transmitting node responds by precoding data according to the received CSI, i.e., operating according to conventional approaches. This could include, for example, precoding according to TRM 9, in an LTE system. This is shown at block 330 in FIG. 3. The precoded data and demodulation reference symbols are then transmitted to the second node, over multiple transmit antennas, as shown at block 350.

If, on the other hand, the transmitting node determines that the CSI for the remote node is likely to be unreliable, the transmitting node randomizes the precoding vectors applied to the transmission. More particularly, the transmitting node applies a precoding vector to the data and the demodulation reference symbols in each of several groups of time-frequency resources, so that the precoding vectors vary randomly or pseudo-randomly from each group of time-frequency resources to the next frequency-adjacent group or groups, or from each group of time-frequency resources to the next time-adjacent group or groups, or both. This is shown at block 340 in FIG. 3. The precoded data and demodulation reference symbols are then transmitted to the second node, over multiple transmit antennas, as shown at block 350.

The set from which the precoders are taken can be such that the precoders cover all directions, in some embodiments. In other embodiments, the random or pseudo-random selection of precoders may be from a subset of all possible precoders, where the subset spans one main direction in the radio channel space. Preferably, the precoders are changed as often as possible. The current LTE standard allows the precoders to be changed every 2-3 resource blocks in the frequency direction, when using transmission mode 9. Precoder changes across the time-frequency resources used for the transmission can also be set so that the changes match predefined Precoding Resource block Group (PRG) sizes, which are defined in 3GPP TS 36.213 for different system bandwidths. Since the DMRS and data use the same precoder, the UE must have some DMRS pilots that use the same precoder so it can estimate the channel-plus-precoder response with good reliability. Accordingly, each precoder should be applied to a group of time-frequency resources that includes both data symbols and a sufficient number of DMRS for this channel estimation process.

The process illustrated in FIG. 3 may be repeated several or many times. Each time it is repeated, the currently available CSI is re-evaluated to determine whether it is reliable or not. For a given mobile terminal, the reliability of the corresponding CSI may change from time to time. Thus, randomized precoding may be applied for a first transmission time interval, because reliable CSI is unavailable. The CSI for a later transmission time interval may be more reliable, so that the system can use precoders that are derived from the CSI. The rate at which this re-evaluation occurs can vary from one system to another. Further, in some cases it may be useful to apply a filtering operation and/or a hysteresis function to the reliability determination process, to avoid overly rapid switching between the randomized precoding mode and the conventional approach.

The techniques described above and illustrated in FIG. 3 can be implemented in a transmitting node in a wireless communication system. This transmitting node can be a base station, such as an eNodeB, in some embodiments. The transmitting node need not be a single physical entity, however. In some cases, for example, the radio frequency circuitry for both the receiver and transmitter circuitry may be in a separate physical unit from a controller circuit. This separate physical unit may be a remote radio unit (RRU), for example, in systems where a base station controls one or several radio transceivers that are geographically separated. In other cases, some or all of the control functionality described herein, such as the evaluation of CSI to determine whether randomized precoding is to be used, may be located in a control unit that is physically separate from a base station, such as in a radio network controller.

According to several embodiments of the present invention, however, the transmitting node includes a transmitting circuit adapted to transmit data and demodulation reference symbols to a second node (such as a wireless device/terminal or an LTE UE) over multiple transmit antennas. The data and DMRS are transmitted in each of a plurality of groups of time-frequency resources during each of one or more transmission time intervals, using a precoding vector applied to the data and the demodulation reference symbols for each group of time-frequency resources. In an LTE system, for example, these groups of time-frequency resources can be individual Resource Blocks, or groups of Resource Blocks.

The transmitting node further includes a control circuit adapted to determine whether CSI corresponding to the second node is likely to be unreliable for a given transmission time interval and to control the transmitting circuit accordingly. In the event that the control circuit determines that the CSI is not reliable for a particular transmission time interval, the control circuit controls the transmitting circuit to apply the precoding vectors to the data and the demodulation reference symbols so that the precoding vectors vary randomly or pseudorandomly from each group of time-frequency resources to the next frequency-adjacent group or groups, or from each group of time-frequency resources to the next time-adjacent group or groups, or both. When the control circuit determines that the CSI is reliable, e.g., for a different transmission time interval, the control circuit controls the transmitting circuit to apply a precoding vector or vectors that are derived from the CSI, e.g., according to TRM 9 as defined in Release 10 of the 3GPP specifications.

Figure 4:
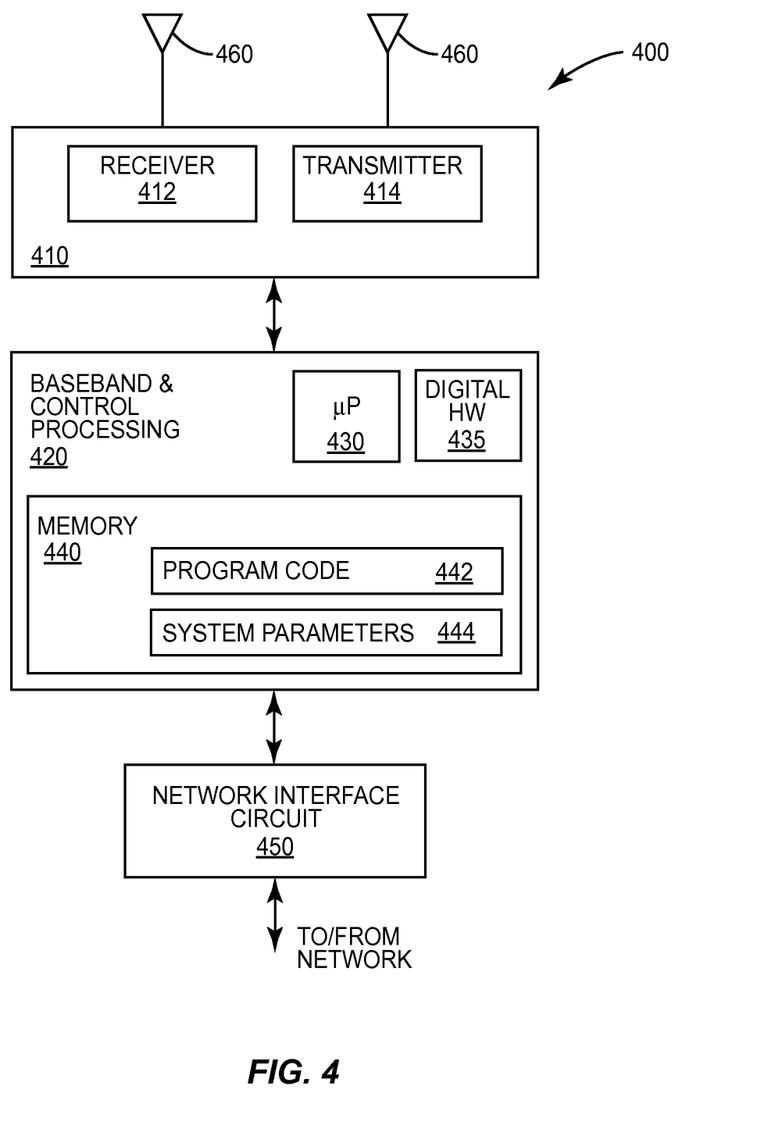
FIG. 4 is a block diagram illustrating functional components of a transmitting node according to some embodiments of the invention.

FIG. 4 illustrates one example of a transmitting node 400 configured in accordance with some embodiments of the present invention. The pictured apparatus includes radio circuitry 410 and baseband & control processing circuit 420. Radio circuitry 410 includes receiver circuits 412 and transmitting circuits 414, each of which use known radio processing and signal processing components and techniques, typically according to one or more particular telecommunications standards such as the 3GPP specifications for LTE. Receiver circuits 412 and transmitting circuits 414 are each connected to two or more antennas 460. Because the various details and engineering trade-offs associated with the design and implementation of such circuitry are well known and are unnecessary to a full understanding of the invention, additional details are not shown here.

Baseband & control processing circuit 420, which corresponds to the control circuit discussed earlier, includes one or more microprocessors or microcontrollers 430, as well as other digital hardware 435, which may include digital signal processors (DSPs), special-purpose digital logic, and the like. Either or both of microprocessor(s) 430 and digital hardware 435 may be configured to execute program code 442 stored in memory 440, along with system parameters 444. Again, because the various details and engineering tradeoffs associated with the design of baseband/control processing circuitry for wireless base stations and other network nodes are well known and are unnecessary to a full understanding of the invention, additional details are not shown here.

Transmitting node 400 further includes a network interface circuit 450, which is configured for communication with other nodes in the wireless network. In an LTE eNodeB, this network interface circuit is configured to communicate with other eNodeBs using the X2 interface and to communicate with the rest of the network using the S1-MME, S11, and S1-U interfaces, for example, where each of these interfaces is defined by 3GPP specifications.

The program code 442 stored in memory circuit 440, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein. System parameters 444 include various pre-determined configuration parameters, such as one or more predefined thresholds for use in evaluating CSI, as well as parameters determined from system measurements and the like.

Accordingly, in various embodiments, processing circuits or control circuits, such as the baseband & control processing circuits 420 of FIG. 4, are configured to carry out one or more of the techniques described above for transmitting data to one or more remote nodes, such as to one or more LTE UEs. In some cases, these processing circuits are configured with appropriate program code, stored in one or more suitable memory devices, to implement one or more of the techniques described herein. Of course, it will be appreciated that not all of the steps of these techniques are necessarily performed by a single microprocessor or even in a single module. Furthermore, it will be appreciated that FIG. 4 illustrates a wireless base station, while some embodiments of the invention may have different physical implementations, including implementations in which all or part of the functionality of the baseband & control processing circuit 420 is separate from the rest of the apparatus. However, implementations according to these other embodiments will nevertheless include similar processing circuitry and network interface circuitry.

Embodiments of the invention described above address a problem with outdated precoder information that can arise when lean carriers are used, where fall-back open-loop transmission modes with common pilots are not available in every subframe. However, the presently disclosed techniques are not limited in their application to be used only on a lean carrier with LTE's TRM 9. For example, these techniques can also be used for TRM7, TRM8, or TRM9 as defined in LTE release 10, where the CRS is present. By using the techniques described above for these transmission modes there is no need for RRC signaling and hence much faster adaption to the current CSI state is obtained. These techniques may be applied to systems other than LTE, as well.

Accordingly, it will be appreciated that the foregoing description and the accompanying drawings represent non-limiting examples of the methods and apparatus taught herein. As such, the present invention is not limited to the specific embodiments provided in the foregoing description and accompanying drawings, but is instead limited only by the following claims and their legal equivalents.

What is claimed is:

1. A method, in a first node of a wireless communication system, for transmitting data to a second node, the method comprising, for a first transmission time interval:
   determining that first channel state information corresponding to the second node is likely to be unreliable for the first transmission time interval; and,
   responsive to said determining that first channel state information is likely to be unreliable, transmitting data and demodulation reference symbols to the second node over multiple transmit antennas in each of a plurality of groups of time-frequency resources during the first transmission time interval, using a precoding vector applied to the data and the demodulation reference symbols for each group of time-frequency resources, wherein the precoding vectors vary randomly or pseudo-randomly from each group of time-frequency resources to the next frequency-adjacent group or groups, or from each group of time-frequency resources to the next time-adjacent group or groups, or both;
and, for a second transmission time interval:
   determining that second channel state information corresponding to the second node is likely to be reliable for the second transmission time interval; and,
   responsive to said determining that second channel state information is likely to be reliable, transmitting data and demodulation reference symbols to the second node over multiple transmit antennas in each of a plurality of groups of time-frequency resources during the second transmission time interval, using one or more precoding vectors that are based on the second channel state information.

2. The method of claim 1, further comprising first obtaining the first channel state information by receiving the first channel state information from the second node.

3. The method of claim 1, further comprising first obtaining the first channel state information by estimating the first channel state information based on uplink transmissions from the second node.

4. The method of claim 1, wherein determining that the first channel state information is likely to be unreliable for the first transmission time interval comprises evaluating the first channel state information and determining that a variability in channel conditions over time exceeds a threshold.

5. The method of claim 4, wherein the first channel state information comprises a recommended precoder and wherein determining that a variability in channel conditions over time exceeds a threshold comprises counting a number of changes in recommended precoder over a time interval and comparing to the threshold.

6. The method of claim 1, wherein determining that the received first channel state information is likely to be unreliable for the first transmission time interval comprises evaluating an age of the received first channel station information relative to the first transmission time interval and determining that the age exceeds a threshold.

7. The method of claim 1, wherein the first node is a wireless base station and the second node is a mobile terminal.

8. The method of claim 1, wherein each group of time-frequency resources comprises one or more time-frequency resource blocks, each corresponding to a plurality of sub-carrier frequencies, wherein the precoding vector for each group of time-frequency resources is constant for all sub-carrier frequencies for the one or more corresponding time-frequency resource blocks.

9. The method of claim 8, wherein each group of time-frequency resources is a Precoding Resource block Group (PRG) in a Long-Term Evolution (LTE) downlink transmission.

10. The method of claim 1, further comprising first encoding a data block for the second node using a turbo code and interleaving the resulting encoded bits across the plurality of groups of time-frequency resources for the first transmission time interval.

11. A transmitting node in a wireless communication system, the transmitting node comprising:
a transmitting circuit adapted to transmit data and demodulation reference symbols to a second node over multiple transmit antennas in each of a plurality of groups of time-frequency resources during each of a plurality of transmission time intervals, using a precoding vector applied to the data and the demodulation reference symbols for each group of time-frequency resources; and
a control circuit adapted:
to determine, for a first transmission time interval, that first channel state information corresponding to the second node is likely to be unreliable for the first transmission time interval and to control the transmitting circuit, responsive to said determining that the first channel state information is likely to be unreliable, to apply the precoding vectors to the data and the demodulation reference symbols so that the precoding vectors vary randomly or pseudorandomly from each group of time-frequency resources to the next frequency-adjacent group or groups, or from each group of time-frequency resources to the next time-adjacent group or groups, or both, and
to determine, for a second transmission time interval, that second channel state information corresponding to the second node is likely to be reliable for the second transmission time interval and to control the transmitting circuit, responsive to said determining that the second channel state information is likely to be reliable, to transmit data and demodulation reference symbols to the second node over multiple transmit antennas in each of a plurality of groups of time-frequency resources during the second transmission time interval, using one or more precoding vectors that are based on the second channel state information.

12. The transmitting node of claim 11, further comprising a receiver circuit adapted to receive the first channel state information from the second node.

13. The transmitting node of claim 11, wherein the control circuit is further adapted to estimate the first channel state information based on uplink transmissions from the second node.

14. The transmitting node of claim 11, wherein the control circuit is adapted to determine that the first channel state information is likely to be unreliable for the first transmission time interval by evaluating the first channel state information and determining that a variability in channel conditions over time exceeds a threshold.

15. The transmitting node of claim 14, wherein the first channel state information comprises a recommended precoder and wherein the control circuit is adapted to determine that a variability in channel conditions over time exceeds a threshold by counting a number of changes in recommended precoder over a time interval and comparing to the threshold.

16. The transmitting node of claim 11, wherein the control circuit is adapted to determine that the received first channel state information is likely to be unreliable for the first transmission time interval by evaluating an age of the received first channel state information relative to the first transmission time interval and determining that the age exceeds a threshold.

17. The transmitting node of claim 11, wherein the transmitting node is a wireless base station and the second node is a mobile terminal.

18. The transmitting node of claim 11, wherein each group of time-frequency resources comprises one or more time-frequency resource blocks, each corresponding to a plurality of sub-carrier frequencies, wherein the precoding vector for each group of time-frequency resources is constant for all sub-carrier frequencies for the one or more corresponding time-frequency resource blocks.

19. The transmitting node of claim 18, wherein each group of time-frequency resources is a Precoding Resource block Group (PRG) in a Long-Term Evolution (LTE) downlink transmission.

20. The transmitting node of claim 11, wherein the control circuit is further adapted to first encode a data block for the second node, using a turbo code, and to interleave the resulting encoded bits across the plurality of groups of time-frequency resources for the first transmission time interval.

21. A method, in a first node of a wireless communication system, for transmitting data to a second node, the method comprising, for a first transmission time interval:
determining that first channel state information corresponding to the second node is likely to be unreliable for the first transmission time interval; and, responsive to said determining, transmitting data and demodulation reference symbols to the second node over multiple transmit antennas in each of a plurality of groups of time-frequency resources during the first transmission time interval, using a precoding vector applied to the data and the demodulation reference symbols for each group of time-frequency resources, wherein the precoding vectors vary randomly or pseudo-randomly from each group of time-frequency resources to the next frequency-adjacent group or groups, or from each group of time-frequency resources to the next time-adjacent group or groups, or both;

wherein the first channel state information comprises a recommended precoder and wherein determining that the first channel state information is likely to be unreliable for the first transmission time interval comprises counting a number of changes in recommended precoder over a time interval and determining that the number of changes exceeds a threshold.

22. A transmitting node in a wireless communication system, the transmitting node comprising:
 a transmitting circuit adapted to transmit data and demodulation reference symbols to a second node over multiple transmit antennas in each of a plurality of groups of time-frequency resources during each of one or more transmission time intervals, using a precoding vector applied to the data and the demodulation reference symbols for each group of time-frequency resources; and
 a control circuit adapted to determine, for a first transmission time interval, that first channel state information corresponding to the second node is likely to be unreliable for the first transmission time interval and to control the transmitting circuit, responsive to said determining, to apply the precoding vectors to the data and the demodulation reference symbols so that the precoding vectors vary randomly or pseudorandomly from each group of time-frequency resources to the next frequency-adjacent group or groups, or from each group of time-frequency resources to the next time-adjacent group or groups, or both, wherein the first channel state information comprises a recommended precoder and wherein determining that the first channel state information is likely to be unreliable for the first transmission time interval comprises determining that a count of a number of changes in recommended precoder over a time interval exceeds a threshold.

23. A method, in a first node of a wireless communication system, for transmitting data to a second node, the method comprising, for a first transmission time interval:
 determining that first channel state information corresponding to the second node is likely to be unreliable for the first transmission time interval; and,
 responsive to said determining that first channel state information is likely to be unreliable, transmitting data and demodulation reference symbols to the second node over multiple transmit antennas in each of a plurality of groups of time-frequency resources during the first transmission time interval, using a precoding vector applied to the data and the demodulation reference symbols for each group of time-frequency resources, wherein the precoding vectors vary randomly or pseudo-randomly from each group of time-frequency resources to the next frequency-adjacent group or groups, or from each group of time-frequency resources to the next time-adjacent group or groups, or both;

wherein determining that the first channel state information is likely to be unreliable for the first transmission time interval comprises evaluating the first channel state information and determining that a variability in channel conditions over time exceeds a threshold.

24. A transmitting node in a wireless communication system, the transmitting node comprising:
 a transmitting circuit adapted to transmit data and demodulation reference symbols to a second node over multiple transmit antennas in each of a plurality of groups of time-frequency resources during each of a plurality of transmission time intervals, using a precoding vector applied to the data and the demodulation reference symbols for each group of time-frequency resources; and
 a control circuit adapted to determine, for a first transmission time interval, that first channel state information corresponding to the second node is likely to be unreliable for the first transmission time interval and to control the transmitting circuit, responsive to said determining that the first channel state information is likely to be unreliable, to apply the precoding vectors to the data and the demodulation reference symbols so that the precoding vectors vary randomly or pseudorandomly from each group of time-frequency resources to the next frequency-adjacent group or groups, or from each group of time-frequency resources to the next time-adjacent group or groups, or both, wherein the control circuit determines that the first channel state information is likely to be unreliable for the first transmission time interval by evaluating the first channel state information and determining that a variability in channel conditions over time exceeds a threshold.

* * * * *